United States Patent [19]

Mizuno

[11] Patent Number: 5,308,009
[45] Date of Patent: May 3, 1994

[54] PHOTOGRAPHIC FILM CASSETTE AND LIGHT-TRAPPING METHOD FOR THE SAME

[75] Inventor: Kazunori Mizuno, Kanagawa, Japan

[73] Assignee: Fuji Photo Film Co., Ltd., Kanagawa, Japan

[21] Appl. No.: 897,079

[22] Filed: Jun. 11, 1992

[51] Int. Cl.$^5$ ............................................. G03B 17/26
[52] U.S. Cl. .................................. 242/71.1; 354/275; 156/293; 156/294
[58] Field of Search ............................. 242/71.1, 71.7; 354/275; 28/165, 170, 162, 159; 156/293, 294, 72, 148

[56] References Cited

U.S. PATENT DOCUMENTS

| | | | |
|---|---|---|---|
| 2,484,225 | 10/1949 | Herzig | 242/71.1 X |
| 3,917,883 | 11/1975 | Jepson | 156/72 X |
| 4,000,342 | 12/1976 | Rochelle et al. | 28/162 X |
| 4,143,197 | 3/1979 | Jasionowicz et al. | 28/165 X |
| 4,272,035 | 6/1981 | Sherman et al. | 242/71.1 |
| 4,730,778 | 3/1988 | Akao et al. | 242/71.1 X |
| 4,832,275 | 5/1989 | Robertson | 242/71.1 |
| 4,834,306 | 5/1989 | Robertson et al. | 242/71.1 |
| 4,846,418 | 7/1989 | Fairman | 242/71.1 |
| 4,848,693 | 7/1989 | Robertson | 242/71.1 |
| 4,875,637 | 10/1989 | Beach | 242/71.1 |
| 4,928,826 | 5/1990 | Shibazaki et al. | 242/71.1 X |
| 5,205,506 | 4/1993 | Mizuno et al. | 242/71.1 |
| 5,217,179 | 6/1993 | Sugiyama | 242/71.1 |

FOREIGN PATENT DOCUMENTS

| | | |
|---|---|---|
| 37-4453 | 3/1962 | Japan . |
| 37-21388 | 8/1962 | Japan . |
| 51-127737 | 10/1976 | Japan . |
| 53-105222 | 9/1978 | Japan . |
| 57-190948 | 11/1982 | Japan . |
| 61-34526 | 10/1986 | Japan . |

*Primary Examiner*—John M. Jillions
*Attorney, Agent, or Firm*—Sughrue, Mion, Zinn, Macpeak & Seas

[57] ABSTRACT

A photographic film cassette has a spool with photographic film wound thereon. A pair of velvet ribbons is attached to inside faces of a passageway of the cassette shell so as to prevent light from entering the cassette shell through the passageway. Rotation of the spool in an unwinding direction causes a leader of the photographic film to advance outward from the passageway between the pair of ribbons. The ribbons are of warp pile fabric woven from warp threads, weft threads and warp pile threads. The ribbons are woven in a structure such that the weft threads are intersected by the warp threads in plain weave, and that warp pile threads are pressed between the warp threads to slang in the direction of the weft threads. The ribbons are oriented so as to slant the pile threads toward an outside of the cassette shell. In a preferred embodiment, a light-trapping ribbon web is woven such that it has a width corresponding to a width of the inside faces of the passageway for attaching ribbons. Ribbons are cut from the ribbon web at a length corresponding to a lateral range of the passageway.

13 Claims, 5 Drawing Sheets

PHOTOGRAPHIC FILM CASSETTE AND LIGHT-TRAPPING METHOD FOR THE SAME

BACKGROUND OF THE INVENTION

1. Field of the Invention

The present invention relates to a photographic film cassette and light-trapping members for the same, and more particularly to a cassette wherein rotation of a spool advances a leader of the photographic film to the outside of the cassette shell.

2. Description of the Related Art

Presently, a photographic film cassette (hereinafter referred to as cassette) containing a roll of 135-type (35 mm wide) photographic filmstrip (hereinafter referred to as film) is widely used. This cassette is constituted by a light-tight cassette shell provided with a passage mouth, a spool rotatably contained in the cassette shell, and photographic film wound on the spool. A pair of light-trapping ribbons (commonly called plush in the field of photography) constituted of strips of fabric are attached inside the passage mouth in order to prevent light from entering through the passage mouth into the cassette shell.

A number of different light-trapping ribbons are known to be effective, including a woven fabric, like velvet, with pile threads woven on its ground as described in Japanese Utility Model Publication No. 37-21388, a knitted fabric with pile threads knitted on its ground as described in Japanese Utility Model Publication No. 61-34526, a set of pile threads planted directly on faces in a passageway for the photographic film as disclosed in Japanese Utility Model Publication no. 37-4453 and Japanese Patent Laid-open Publication Nos. 53-105222 and 57-190948, and a non-woven fiber sheet as disclosed in Japanese Utility Model Laid-open Publication No. 51-127737.

As described in U.S. Pat. Nos. 4,832,275, 4,834,306, 4,848,693, and 4,846,418, a leader-advancing cassette has been proposed in which the photographic film is initially contained completely within the cassette, and the leader is advanced to the passage mouth upon rotation of the spool in the direction of unwinding the photographic film. In such a cassette, rotation of the spool by a mechanism of the camera causes the leader to advance to the outside of the cassette shell through the passage mouth.

If a pile fabric having pile threads is used as light-trapping ribbons, the directions of pile threads can become unfavorably disorganized during manufacturing processes such as dying and brushing. In some cases, pile threads will be, possibly irrecoverably, inclined in the film rewinding direction, i.e., toward the inside of the cassette shell.

With a leader-advancing cassette, whose leader is positioned initially within the cassette, the leader must advance through the passageway against any resistance due to the light-trapping ribbons therein. If there is a considerably large resistance, the photographic film may be bent within the cassette, and rotation of the spool might fail to advance the leader. Also, a battery powering the advance mechanism of the camera will be quickly consumed if the resistance to film advancement is high, because a relatively large torque is required to rotate the spool.

SUMMARY OF THE INVENTION

In view of the foregoing problems, an object of the present invention is to provide a photographic film cassette and a light trapping method therefor by which light-trapping ribbons cause little resistance against advancement of a leader of a photographic film.

Another object of the present invention is to provide a photographic film cassette and a light-trapping method therefor by which rotation of a spool can reliably advance a leader outward from a cassette shell.

A further object of the present invention is to provide a photographic film cassette and a light-trapping method therefor by which light-trapping ribbons can be efficiently prepared and attached.

In order to achieve the above and other objects and advantages of this invention, the ribbons are of warp pile fabric woven from warp threads, weft threads and warp pile threads, and are constructed such that a first warp thread of one pair of warp threads juxtaposed to one pile thread passes above a weft thread, across which the one pile thread passes from below, and that a second warp thread of the one pair of warp threads passes below the weft thread across which the one pile thread passes from below. Due to this construction, the pile threads are slanted in a predetermined direction relative to a ground constitute of the warp and weft threads. The ribbons are then oriented so that the pile threads slant toward an outside of a cassette shell.

The light-trapping ribbons of the invention cause little resistance against advancement of a leader of a photographic film. Therefore, rotation of a spool can reliably advance a leader outward from the cassette shell.

In a preferred embodiment, ribbons are of pile fabric woven from warp threads, weft threads and pile threads, and woven so as to have a width corresponding to a width of faces formed inside a passageway for attaching the ribbons. Also, the ribbons can be prepared and attached with great efficiency, e.g., without creating dust when cutting the web into ribbons.

In accordance with a light-trapping method of the present invention, a light-trapping ribbon web is woven, so as to have a width corresponding to a width of faces formed inside a passageway for attaching ribbons, and are pile fabric woven from warp threads, weft threads and pile threads. The pile threads are slanted in a predetermined direction relative to a ground constituted of the warp and weft threads. The ribbons are cut from the ribbon web at a length corresponding to a lateral range of the passageway. The ribbons are then attached to the inside of the passageway so that the pile threads slant toward the outside of the cassette shell.

BRIEF DESCRIPTION OF THE DRAWINGS

The above objects and advantages of the present invention will become more apparent from the following detailed description when read in connection with the accompanying drawings, in which:

FIG. 4 illustrates a weaving method of light-trapping ribbons in accordance with first and third to fifth preferred embodiments;

FIG. 5 illustrates a weaving method of ribbons in accordance with a second preferred embodiment;

DETAILED DESCRIPTION OF THE PREFERRED EMBODIMENTS

Figure 1:
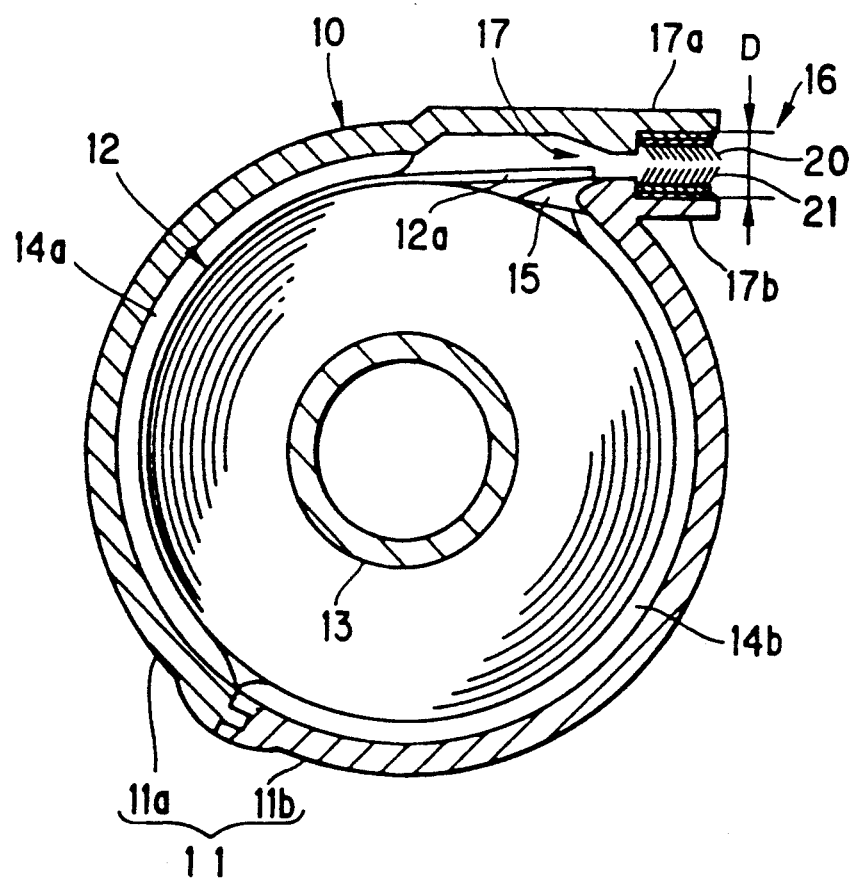
FIG. 1 is a cross section illustrating a photographic film cassette according to the present invention.
Figure 2:
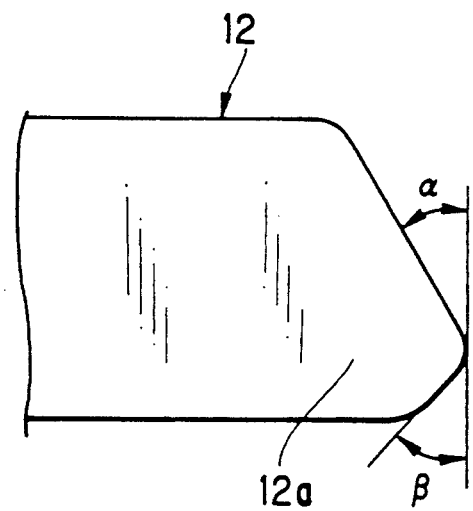
FIG. 2 is a plan view illustrating a leader of a photographic film of the cassette.

FIG. 1 illustrates a photographic film cassette 10 according to the first preferred embodiment of the present invention. A cassette shell 11 is constituted of a pair of shell halves 11a and 11b joined together, in a light-tight fashion, by ultrasonic welding, or the like. Photographic film 12, e.g., FUJI COLOR SUPER HG 400 (trade name; manufactured by Fuji Photo Film Co., Ltd.) is wound on a spool 13 and contained in the casseette shell 11. As shown in FIG. 2, the leading end of a leader 12a of the photographic film 12 is cut triangularly, at an angle $\alpha$ being 30° with respect to a transverse axis of the film 12 and at an angle $\beta$ being 45° thereto.

The cassette shell 11 is molded from light-shielding plastic, e.g., high-impact polystyrene (HIPS) with carbon black added at 0.5%. Two pairs of arcuate ridges 14a and 14b are formed on the inside of the cassette shell 11 to reduce the frictional force generated between the cassette shell 11 and the photographic film 12, as well as to prevent photographic film 12 from loosening. A separator claw 15 is disposed on an inside surface of the cassette shell 11 to separate the leading end of the photographic film 12 from the inner roll of film.

A passage mouth 16 is formed in the cassette shell for allowing the photographic film 12 to pass therethrough to the outside of cassette shell 11. Ribbons or fabric strips 20 and 21, made of velvet, for trapping light are attached to faces on upper and lower tongues 17a and 17b respectively. Tongues 17a and 17b define a passageway 17 interior to the passage mouth 16. The ribbons 20 and 21 prevent light from entering the inside of the cassette shell 11 through the passageway 17. The passageway 17 is formed so as to define a gap D between the faces of the tongues 17a and 17b which is 2.3 mm wide. Although the opposite pile threads of the ribbons 20 and 21 are actually pressed together, they are shown in FIG. 1 as having a spacing therebetween for the purpose of clarity.

Figure 3:
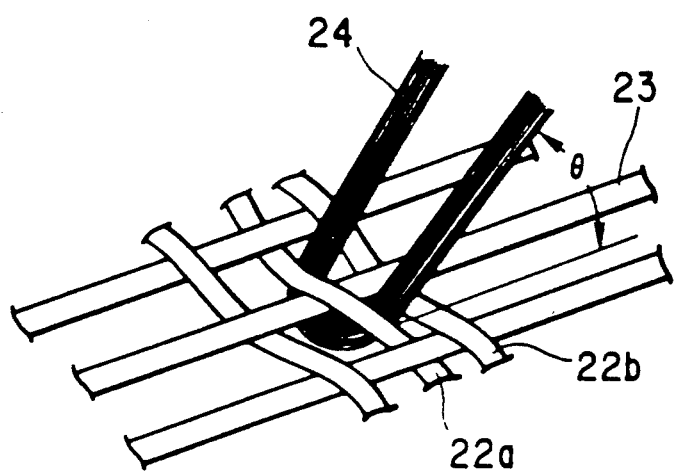
FIG. 3 is a perspective view illustrating a structure of intersection between warp threads, weft threads, and one pile thread.
Figures 4, 5:
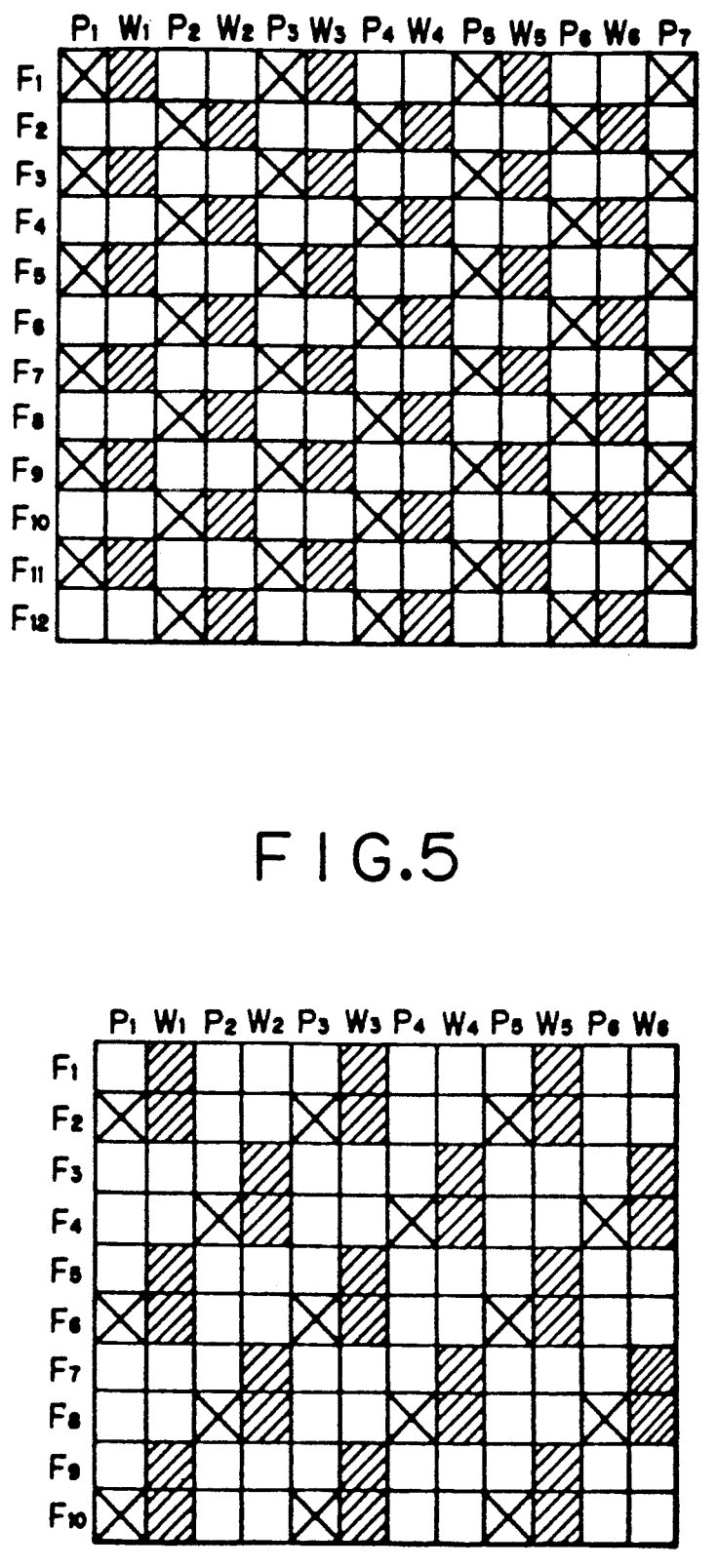

Referring to FIG. 3, the ribbons 20 and 21 are of velvet having a ground woven from warp threads 22a, 22b, etc. . . . of rayon of 120 denier/30 filaments and weft threads 23 of polyester of 120 denier/24 filaments having a heat-shrinkable characteristic. The density of inserting the weft threads is 90 threads per inch. The density of weaving the warp threads is 120 threads per inch. The warp pile threads 24 are cuprammonium rayon of 100 denier/40 filaments. A velvet ribbon web is woven in a shuttle loom, at a fabric width of 50 mm, at the pile weaving width of 45 mm, and in a weaving structure as illustrated in FIG. 4. In particular, the weft threads intersect the warp threads in the structure of a plain weave, and the warp pile threads are disposed in alternation with the warp threads. In FIG. 4, reference W represents a warp thread, F represents a weft thread, P represents a pile thread, a hatching portion represents the area where the warp thread is above the weft thread, and an X portion represents the area where the pile thread is above the weft thread. By shearing the X portions, the pile threads 24 shown in FIG. 3 can be obtained.

The ribbon web, as woven, is processed in a shearing machine to cut the pile threads 24 at the height of 2.0 mm so as to yield velvet. The velvet ribbon web is dyed black in a wince dying machine, and processed with heat at 150° C. in a dryer incorporating a brushing roller while brushing the pile threads 24 upward, so as to shrink the heat-shrinkable weft threads 23 to increase the warp thread weaving density up to 150 threads per inch. The back surface of the ground is coated with a sealing material, e.g., acrylic resin at 40 g/m$^2$. Acrylic adhesive agent is then applied thereto at 70 g/m$^2$. The velvet ribbon web thus finished is cut in the width of 5 mm, placed on the inside faces of the upper and lower tongues 17a and 17b, heated by a heat sealer, and attached to the faces of the upper and lower tongues 17a and 17b so that the pile threads 24 slant outward of the cassette, respectively, as illustrated in FIG. 1.

As illustrated in FIG. 3, the warp thread 22a (or $W_1$ for example in FIG. 4), in left-hand disposition from the pile thread 24 ($P_2$), passes above and across the weft thread 23 ($F_3$) to press the pile thread 24 ($P_2$) laterally. The warp thread 22b ($W_2$), in right-hand disposition from the pile thread 24 ($P_2$), passes below and across the weft thread 23 ($F_3$) to define a space to receive the pile thread 24 ($P_2$) when the pile thread 24 is slanted due to lateral force from warp thread 22a. The increase in the density of the warp threads up to 150 threads per inch helps slant the pile thread 24 structurally at the angle $\theta$ which is approximately 45° with respect to the ground.

The photographic film cassette according to a second preferred embodiment has ribbons of velvet, having a ground woven from warp threads of rayon of 120 denier/20 filaments and weft threads of rayon of 150 denier/24 filaments. The ribbon web is woven in a manner similar to the first embodiment but in a weaving structure as illustrated in FIG. 5. In particular, the weft threads intersect the warp threads in the structure of warp rib weave, and that the warp pile threads are disposed in alternation with the warp threads. The warp thread is woven at a density of 200 threads per inch. The angle $\theta$ of slant of the pile threads is approximately 40°. Reference numerals W, F, P, and X and hatching represent the same characteristics as in FIG. 4.

The torque applied to the spool when advancing the leader was measured with a torquemeter for each of the cassettes according to the two embodiments, as well as for one comparative example. Each measured torque value used was a value at which the torque values peaked during a period until the time when the triangular leading end of the leader fully appears outside of the passage mouth. The leader advancing operation was repeated thirty times, from which a leader-advancing percentage was calculated in accordance with the number of successes in advancing the leader. Comparative example 1 was similar to the first embodiment but had warp threads woven up to the density of 75 threads per inch, and weft threads inserted at the density of 73 threads per inch.

TABLE 1

|  | 1st Embodiment | 2nd Embodiment | Comparative Example 1 |
| --- | --- | --- | --- |
| Warp Weaving Density (Threads per Inch) | 150 | 200 | 75 |
| Angle $\theta$ of Slant Approximately | 45° | 40° | 90° |
| Torque for Advancing Leader (g·cm) | 180 | 220 | 850 |
| Percentage of Times Successful in Advancing Leader | 100 | 100 | 67 |

Based upon the data in Table 1, it is apparent that, in either of the two preferred embodiments, only a relatively small torque is required to advance the leader from the inside of the cassette shell 11. Comparative example 1, however, requires a substantially higher torque and thus is low in its leader advancing percentage.

The present embodiments, as described above, utilize a weaving structure of the ribbons such that the pile threads 24 are slanted or inclined with respect to their bottom, and the weft threads 23 are heat-shrinkable so that the warp threads 22a, 22b, . . . are pressed together. Thus, the ribbons have a low resistance to advancement of the leader 12a so as to reduce the torque required to advance the leader 12a.

Warp and weft threads used for weaving the ground can be 70 to 180 denier thick, preferably 100 to 150 denier thick. Should they be too thin, they would be likely to be cut off during weaving. Should they be too thick, fraying might be caused. Threads for the warp and weft threads can include 8 to 50 filaments, preferably 12 to 36 filaments.

The pile threads can preferably be 50 to 120 denier thick. Should they be too thick, they would tend to flex in a plurality of directions. Threads for the pile threads can preferably include 30 to 90 filaments. Should they be too thin, the density would be excessively low, and the pile threads would tend to drop down, because warp and weft threads would be spaced excessively. Should they have too few filaments, the light-trapping effect of the pile threads would be undesirably low. In the case where the pile threads have too many filaments, the thickness per filament would be too small, and the pile threads would tend to flex in a plurality of directions. The leading end of the leader 12a has a preferably triangular shape so as to facilitate the initial advancement of the leader 12a. The surfaces of ribbons may also be processed with an antistatic agent or a lubricant in order to reduce the coefficient of friction between the surfaces and the photographic film.

Conventionally, light-trapping ribbons are prepared or attached with a low efficiency and dust might is often created when cutting the pile threads or when cutting the ribbon web into ribbons. The third to fifth preferred embodiments of the invention solve these problems. A cassette according to the third preferred embodiment is provided with ribbons of a narrow ribbon web 30 woven at the small width, e.g., 5.0 mm, by a needle loom, of gray fabric (as known in the textile industry). The width corresponds to the width of the faces inside the passageway 17 for attaching the ribbons. The ribbon web 30 has a ground woven from warp threads twisted from two yarns of static-fee nylon of 50 denier/10 filaments, together with weft threads of static-free nylon of 75 denier/24 filaments. Pile threads are of nylon of 100 denier/48 filaments. The ribbon web 30 is woven in the weaving structure of FIG. 4. The ribbon web 30 is dyed black with acid dye, and dried while being brushed to erect the pile threads regularly.

Figure 6:
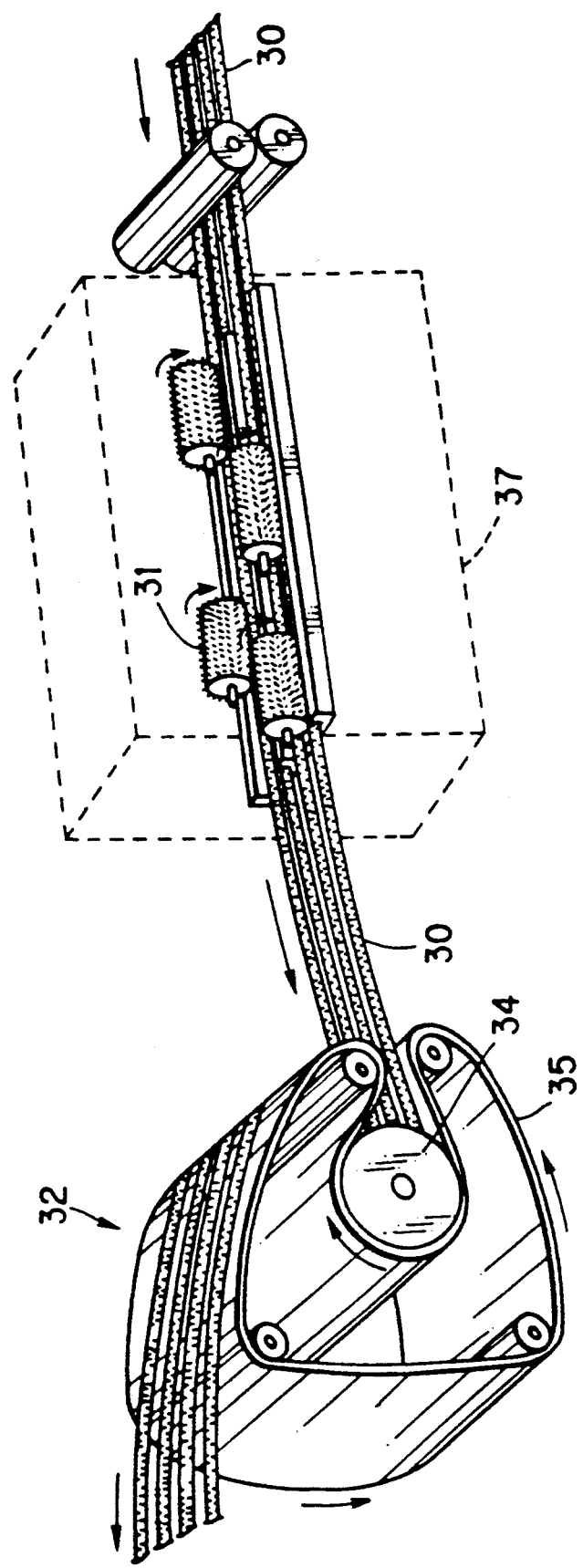
FIG. 6 is an explanatory view illustrating a device for imparting a slanted characteristic to the ribbons in accordance with the third to fifth preferred embodiment.
Figure 7:
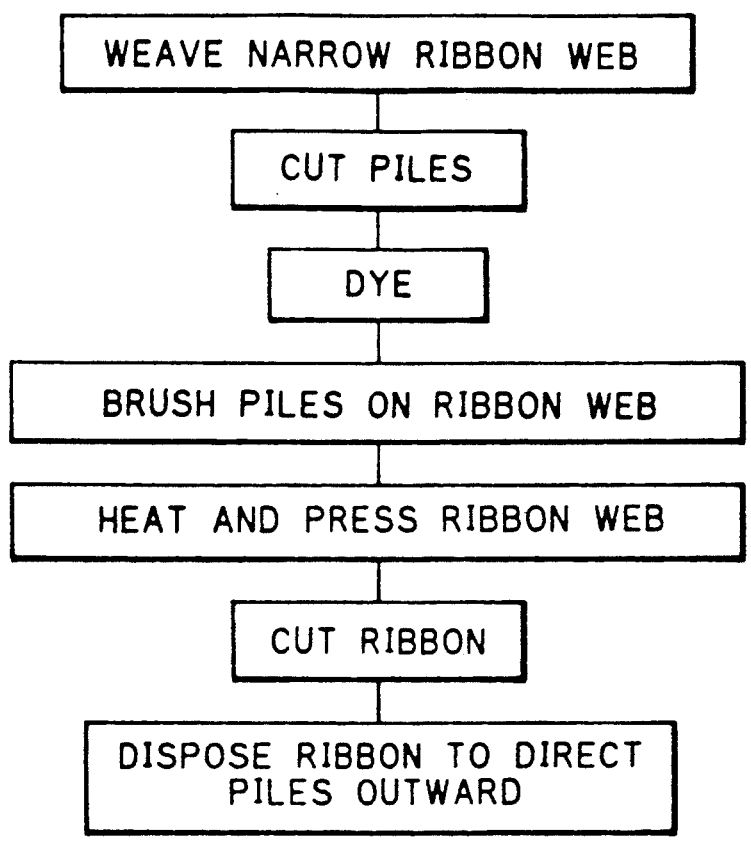
FIG. 7 is a flowchart illustrating a light-trapping method according to the present invention.

The narrow continuous ribbon webs 30 are supplied into a slant-processing device as illustrated in FIG. 6. Roller brushes 31, with pig's fur attached thereon, are caused to rotate in the widthwise direction of the ribbon webs 30 and thereby brush the ribbon webs 30. The ribbon webs 30 are then squeezed in the felt press unit 32, heated to 180° C., and held under pressure for approximately one minute. Reference numeral 34 designates a heater drum. Reference numeral 35 designates an endless felt belt. Accordingly, the pile threads are slanted with respect to the ground at an angle $\theta$ which was measured to be approximately 50°. The width of the ribbon webs 30 is 4.5 mm while the pile weaving width is 3.5 mm. The ribbon webs 30 are cut into ribbons at a length corresponding to the lateral range of the passageway 17, and are then attached to the inside faces of the passageway 17 with a hot-melt adhesive agent having a semi-tacky characteristic. The thickness of the ribbons was measured with a Peacock thickness gauge (trade name; manufactured by Ozaki Mfg. Co., Ltd.) under a pressure of 5 g/cm$^2$, to obtain 1.7 mm. The reduced height of the pile threads, due to being pressed by the opposite pile threads, was 0.55 mm.

The ribbon web according to the fourth preferred embodiment is the same as the third preferred embodiment except that the pile threads are of rayon of 100 denier/40 filaments, and that the gray fabric is woven at the width of 5.0 mm. The ground is dyed black with acid dye; the pile threads are dyed black with direct dye through a one-bath/two-step dying process. The continuous ribbon webs are supplied into the device of FIG. 6, brushed by the furry roller brushes 31 vertically to the lengthwise direction, and squeezed in the felt press unit 32 at 150° C. to be pressed for about 30 seconds. The remaining procedure is the same as in the third embodiment. The angle $\theta$ of slant of the pile threads with respect to the ground, as a result, was measured to be approximately 30°. The thickness of the ribbons was measured with a Peacock thickness gauge under a pressure of 5 g/cm$^2$, to obtain 1.5 mm. The reduced height of the pile threads was 0.35 mm.

A cassette according to the fifth preferred embodiment is similar to the third embodiment but has ribbons which are not processed by a slant-processing device. The prepared ribbon was measured, and was 1.8 mm thick. The reduced amount of the height of pile threads was 0.65 mm. The angle $\theta$ of slant of the pile threads was approximately 65°.

Comparative example 2 was prepared from ribbons cut from a wide ribbon web. The velvet ribbon web was woven at the width of 35 mm, otherwise under the same conditions as the third embodiment, processed in a conventional slant-processing device, slit into strips having a width of 4.5 mm by an ultrasonic slitter, and attached on the faces in the passageway 17. Comparative example 3 has ribbons cut from a wide velvet ribbon web, which was woven at the width of 35 mm of gray fabric, otherwise under the same conditions as the fourth embodiment, processed in the conventional slant-processing device, slit into strips having a width of 4.5 mm by an ultrasonic slitter, and attached on the faces in the passageway 17.

Experiments were conducted with cassettes utilizing these light-trapping members. The results are shown below, including the measured torque for advancing the leader, the obtained percentage of successful times in advancing the leader, adequacy of shielding light, and quantity of pile dust created before attachment:

TABLE 2

|  | 3rd Embodiment | 4th Embodiment | 5th Embodiment | Comparative Example 2 | Comparative Example 3 |
| --- | --- | --- | --- | --- | --- |
| Lengthwise Slitting | None | None | None | Into 6 | Into 6 |
| Angle θ of Slant | 50° | 30° | 65° | 30°–130° | 30°–150° |
| Torque for Advancing Leader (g · cm) | 200 | 180 | 250 | 250–900 | 200–700 |
| Percentage of Times Successful in Advancing Leader | 100 | 100 | 100 | 94 | 96 |
| Light Shielding Adequacy | High | High | High | High or low | High or low |
| Pile Dust (Threads per cm$^2$) as Created | 10 or fewer | 10 or fewer | 10 or fewer | 100 or more | 100 or more |

The torque applied to the spool during film advancement was measured by a torquemeter. The measured value used was a peak value of measured values obtained from starting the spool rotating to advancing the leader 12a our of the passage mouth 16. The leader advancing percentage used herein is a ratio of the number of cassettes whose leader reliably exited out of the passage mouth upon spool rotation, to the total number, 50 herein, multiplied by 100. Adequacy for shielding light was measured by exposing the passage mouth 16 of each cassette, with the unexposed photographic film 12 wound therein, to light at 100,000 lux for 3 minutes in order to determine how many outer turns of the roll of film would exhibit fogging by visually inspecting the photographic film 12 after development. "High" adequacy in Table 2 indicates a situation of no fogging, whereas "Low" adequacy indicates a situation where the second outermost turn of the roll was fogged. The creation of pile dust was determined by sticking transparent adhesive tape on the velvet surface with pile threads, peeling the tape, sticking it on white paper, and observing the amount of pile dust stuck on the tape.

Based upon the data in Table 2, it is apparent that, in any of the third to fifth preferred embodiments, the leader was perfectly advanced outward, and that only a relatively small torque was required to advance the film leader from the inside of the cassette shell 11. Light shielding characteristics of the passageway of these embodiments are also adequate. Comparative examples 2 and 3, however, required a substantially higher torque, due partly to a failure in a slanting process, and were thus low in leader advancing percentage. Further, these examples generated high levels of pile dust, and had a low capability of shielding light.

The ribbon webs according to third and fourth preferred embodiments are heated by the heater drum 34 in the felt press unit 32. However, a heater unit 37 may be provided surrounding the roller brushes 31, instead of the felt press unit 32, in order to heat the ribbon webs 30 not after, but at the same time as, brushing the pile threads. It is noted that the ribbons according to the fifth preferred embodiment, not processed with a slant-processing device, still have pile threads which are structurally slanted. Accordingly, this device exhibited a somewhat good performance, as perfect in advancing the leader and adequate in shielding light. However, the necessary torque was slightly higher.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film cassette including a spool with photographic film wound thereon, a cassette shell for containing said spool rotatably, and a pair of light-trapping ribbons attached to an inside of a photographic film passageway of said cassette shell for preventing light from entering said cassette shell through said passageway, rotation of said spool in an unwinding direction causing a leader of said photographic film to advance outward from said passageway between said pair of ribbons, wherein:

said ribbons are a warp pile fabric woven from warp threads, weft threads and warp pile threads, and being constructed such that a first warp thread of one pair of warp threads juxtaposed to one pile thread passes above and across a weft thread, said one pile thread passing below and across said weft thread, and that a second warp thread of said one pair of warp threads passes below and across said weft thread;

said pile threads being slanted in a predetermined direction relative to a ground constituted of said warp and weft threads, which is towards said second warp thread and along said weft threads; and said ribbons being oriented so that said pile threads slant toward and outside of said cassette shell.

2. A photographic film cassette as defined in claim 1, wherein said ground has said warp threads woven at a density of at least 100 threads per inch.

3. A photographic film cassette as defined in claim 2, wherein:

$$35 \leq \theta \leq 80$$

where θ is an angle of said pile threads with respect to said weft threads in degrees.

4. A photographic film cassette as defined in claim 3, wherein said cassette shell is constituted of a pair of shell halves.

5. A photographic film cassette as defined in claim 4, wherein said weft threads have a heat-shrinkable characteristic, and said ribbons are heated before being attached so as to bring said density of said warp threads up to at least 100 threads per inch, thereby causing said pile threads to slant.

6. A photographic film cassette as defined in claim 4, wherein said pile threads are black.

7. A photographic film cassette as defined in claim 6, wherein said pile threads are disposed in alternation with said warp threads.

8. A photographic film cassette as defined in claim 7, wherein an end of said leader of said photographic film is cut in a triangular shape.

9. A photographic film cassette as defined in claim 7, wherein said warp threads and said weft threads are woven together in a structure of a plain weave.

10. A photographic film cassette as defined in claim 9, wherein said pile threads alternate passing above and across, with passing below and across, respective of said weft threads.

11. A photographic film cassette as defined in claim 7, wherein said warp threads and said weft threads are woven together in a structure of a warp rib weave.

12. A photographic film cassette as defined in claim 11, wherein said pile threads alternate passing below and across three consecutive of said weft threads, while passing above and across one of said weft threads juxtaposed thereto.

13. A photographic film cassette including a spool with photographic file wound thereon, a cassette shell for containing said spool rotatably, and a pair of light-trapping ribbons attached to an inside of a photographic film passageway of said cassette shell for preventing light from entering said cassette shell through said passageway, rotation of said spool in an unwinding direction causing a leader of said photographic film to advance outward from said passageway between said pair of ribbons, wherein:

said ribbons are a pile fabric woven from warp threads, weft threads and pile threads, so as to have a width corresponding to a width of faces formed inside said passageway for attaching said ribbons;

said pile threads being slanted in a predetermined direction, which is along said weft threads, relative to a ground constituted of said warp and weft threads; and said ribbons being oriented so as to cause said pile threads to slant toward an outside of said cassette shell.

* * * * *